(12) United States Patent
Yamada

(10) Patent No.: US 8,799,910 B2
(45) Date of Patent: Aug. 5, 2014

(54) DATA PROCESSING USING DIFFERENT DATA FORMATS BASED ON SHARED RESOURCE UTILIZATION

(75) Inventor: Naoto Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1120 days.

(21) Appl. No.: 12/502,957

(22) Filed: Jul. 14, 2009

(65) Prior Publication Data

US 2010/0017805 A1    Jan. 21, 2010

(30) Foreign Application Priority Data

Jul. 18, 2008   (JP) ................................. 2008-187117

(51) Int. Cl.
*G06F 9/46*   (2006.01)

(52) U.S. Cl.
USPC ........................................................ 718/101

(58) Field of Classification Search
CPC combination set(s) only.
See application file for complete search history.

(56) References Cited

U.S. PATENT DOCUMENTS

| | | | |
|---|---|---|---|
| 6,817,013 B2 * | 11/2004 | Tabata et al. | 717/151 |
| 7,058,945 B2 * | 6/2006 | Ichinose et al. | 718/102 |
| 7,420,699 B2 * | 9/2008 | Farrell et al. | 358/1.15 |
| 2010/0146516 A1 * | 6/2010 | Yao | 718/105 |

FOREIGN PATENT DOCUMENTS

JP         10-139253        5/1998

* cited by examiner

*Primary Examiner* — Meng-Ai An
*Assistant Examiner* — Eric C Wai
(74) *Attorney, Agent, or Firm* — Canon USA Inc. IP Divison

(57) ABSTRACT

When a plurality of jobs are processed using a plurality of data processing units, data formats of the jobs to be processed can be determined to distribute a data processing load of the data processing units. A method for controlling a data processing apparatus for causing a plurality of data processing units to process data of a job includes storing data of a first job in a storing unit in first and second data formats, determining whether to process the stored data of the first job in the first or second data format, and causing the plurality of data processing units to process the data in the determined data format. The determination is made based on whether processing of data of a second job by the first or second processing unit requires longer time.

12 Claims, 12 Drawing Sheets

FIG. 4A

| JOB NUMBER | JOB TYPE | DATA FORMAT | DATA SIZE | PAGE NUMBER |
|---|---|---|---|---|
| JOB1 : | MEMORY PRINT | CODE DATA | 6 MB | 0001 |
|  |  | BITMAP | 120 MB | 0001 |
|  |  | ⋮ |  |  |

FIG. 4B

| JOB NUMBER | JOB TYPE | DATA FORMAT | DATA SIZE | PAGE NUMBER |
|---|---|---|---|---|
| JOB1 : | MEMORY PRINT | CODE DATA | 6 MB | 0005 |
|  |  | BITMAP | 120 MB | 0005 |
| JOB2 : | COPY | BITMAP | 120 MB | 0001 |
|  |  | ⋮ |  |  |

FIG. 4C

| JOB NUMBER | JOB TYPE | DATA FORMAT | DATA SIZE | PAGE NUMBER |
|---|---|---|---|---|
| JOB1 : | MEMORY PRINT | CODE DATA | 6 MB | 0005 |
|  |  | BITMAP | 120 MB | 0005 |
| JOB2 : | PREVIEW | CODE DATA | 6 MB | 0001 |
|  |  | ⋮ |  |  |

FIG. 5A

| JOB NUMBER | PAGE NUMBER | DATA FORMAT | IMAGE MEMORY (READ) | IMAGE MEMORY (WRITE) | RENDERING PROCESSING |
|---|---|---|---|---|---|
| JOB1 | 0005 | CODE DATA | 10 msec | NONE | 125 msec |
|  |  | BITMAP | 100 msec | NONE | NONE |
| ... |  |  |  |  |  |

| JOB NUMBER | PAGE NUMBER | DATA FORMAT | IMAGE MEMORY (READ) | IMAGE MEMORY (WRITE) | RENDERING PROCESSING |
|---|---|---|---|---|---|
| JOB1 | 0005 | CODE DATA | 15 msec | NONE | 125 msec |
|  |  | BITMAP | 200 msec | NONE | NONE |
| JOB2 | 0001 | BITMAP | 200 msec | NONE | 125 msec |
| ... |  |  |  |  |  |

| JOB NUMBER | PAGE NUMBER | DATA FORMAT | IMAGE MEMORY (READ) | IMAGE MEMORY (WRITE) | RENDERING PROCESSING | ... | PROCESSING PRIORITY |
|---|---|---|---|---|---|---|---|
| 5001 | 5002 | 5003 | 5004 | 5005 | 5006 | | 5007 |
| JOB1 | 0005 | CODE DATA<br>BITMAP | 10 msec<br>150 msec | NONE<br>NONE | 60 msec<br>NONE | ... | 1 |

FIG. 8B

| JOB NUMBER | PAGE NUMBER | DATA FORMAT | IMAGE MEMORY (READ) | IMAGE MEMORY (WRITE) | RENDERING PROCESSING | ... | PROCESSING PRIORITY |
|---|---|---|---|---|---|---|---|
| 5001 | 5002 | 5003 | 5004 | 5005 | 5006 | | 5007 |
| JOB1 | 0005 | CODE DATA<br>BITMAP | 12 msec<br>155 msec | NONE<br>NONE | 120 msec<br>NONE | ... | 2 |
| JOB2 | 0001 | CODE DATA | 15 msec | NONE | 120 msec | | 1 |

FIG. 9

| PRIORITY MANAGEMENT TABLE | 9c |
|---|---|
| PRIORITY | JOB TYPE |
| 001 | PREVIEW |
| 001 | FILE TRANSMISSION |
| 002 | COPY |
| 002 | PRINT |
| 002 | MEMORY PRINT |
| 002 | FAX TRANSMISSION |
| 003 | FAX RECEPTION |
| 004 | ... |

FIG. 11

| STORAGE MEDIUM, SUCH AS FD AND CD-ROM |
|---|
| DIRECTORY INFORMATION |
| FIRST PROCESSING PROGRAM<br>PROGRAM CODES CORRESPONDING TO STEPS OF FLOWCHART SHOWN IN FIG. 6 |
| SECOND PROCESSING PROGRAM<br>PROGRAM CODES CORRESPONDING TO STEPS OF FLOWCHART SHOWN IN FIG. 10 |
| |

DATA PROCESSING USING DIFFERENT DATA FORMATS BASED ON SHARED RESOURCE UTILIZATION

BACKGROUND OF THE INVENTION

1. Field of the Invention

The present invention relates to a data processing apparatus, a method for controlling the data processing apparatus, and a computer-readable storage medium.

2. Description of the Related Art

Recently, data processing apparatuses for processing image data resulting from scanning of an original image have been used. The data processing apparatuses of this kind scan original image information with a scanner or the like and temporarily store the original image data in a memory. The data processing apparatuses also store image data of a print job transmitted from each client via a network in the memory.

Image processing, such as reduction, enlargement, and rotation of the image, is then performed on the image data stored in the memory in accordance with a user's request. In this manner, the data processing apparatuses can output an image of the original document based on the processed image data.

The data processing apparatuses of this kind require a technique for efficiently transferring image data using a memory and a technique for rendering transmitted print data using the memory.

FIG. 12 is a block diagram showing an example of a configuration of a data processing apparatus 10000 according to the related art. The data processing apparatus 10000 uses a memory of this kind.

The data processing apparatus 10000 has a central processing unit (CPU) bus 1 shown in FIG. 12. The CPU bus 1 is connected to a system control section 2, a memory control section 3, a direct memory access controller (hereinafter, abbreviated as "DMAC") 4, an image scanning section 5, an image forming section 6, an image rendering section 7, and a communication section 8.

The system control section 2 connected to the CPU bus 1 includes a CPU 2a, a read-only memory (ROM) 2b, a random access memory (RAM) 2c, and an operation unit 2d. The CPU 2a controls the data processing apparatus 10000. A control program executed by the CPU 2a is stored in the ROM 2b. The RAM 2c is a memory temporarily used by the CPU 2a to execute arithmetic processing and to execute the control program.

For example, the CPU 2a writes a control command in the RAM 2c in response to output of the control command, such as an activation command of the image scanning section 5, the image forming section 6, and the image rendering section 7. Upon receiving a notification of completion of writing of image data, the CPU 2a determines whether the notification corresponds to the control command.

The operation unit 2d serves as an interface between a user and the data processing apparatus 10000. The CPU 2a executes predetermined data processing in accordance with an instruction supplied from the operation unit 2d.

A memory controller 3a connected to the CPU bus 1 serves as an interface to an image memory 3b, which has a relatively large capacity sufficiently enough to store data of a plurality of pages. The memory controller 3a is connected to the image memory 3b through a memory bus 3c.

Although not shown, encoded data is also stored by performing encoding processing. The DMAC 4 executes data transfer between devices without through the CPU 2a and can execute data transfer at a higher rate than the CPU 2a.

The image scanning section 5 connected to the CPU bus 1 has a scanner interface (I/F) 5a, a scanner unit 200, and a page memory 5b.

The scanner I/F 5a controls driving of the scanner unit 200 and controls writing and reading of image data (DATA) in the page memory 5b.

The page memory 5b stores image data of one page supplied from the scanner unit 200. The page memory 5b is used to adjust data transfer rates of the scanner unit 200 and the CPU 2a and improve utilization efficiency of the CPU bus 1.

The image rendering section 7 connected to the CPU bus 1 receives a print job from an external apparatus connected to a network through the communication section 8, which serves as an interface to the network. A rendering unit 7a of the image rendering section 7 renders data contained in the received print job into data that can be handled by each processing section connected to the CPU bus 1 using a work memory 7b to execute rendering processing.

The image forming section 6 connected to the CPU bus 1 has a printer interface (I/F) 6a, a page memory 6b, and a printer unit 100.

The printer I/F 6a controls driving of the printer unit 100 and controls writing and reading of image data in the page memory 6b.

The page memory 6b stores data of one page to be written in the printer unit 100. The page memory 6b is used to adjust data transfer rates of the printer unit 100 and the CPU 2a and improve utilization efficiency of the CPU bus 1.

Operation performed by the data processing apparatus 10000 will now be described.

A copy operation for copying a one-page original document will be described first.

Upon receiving a copy instruction from the operation unit 2d, the CPU 2a instructs the image scanning section 5 to drive the scanner unit 200. In response to this instruction, the scanner I/F 5a drives the scanner unit 200 to acquire image data of the original document from the scanner unit 200 and stores the image data in the page memory 5b. After storage of the image data of one page in the page memory 5b, the scanner I/F 5a notifies the CPU 2a of completion of scanning of the image data.

Upon receiving this notification, the CPU 2a instructs the DMAC 4 to transfer the image data from the scanner I/F 5a to the printer I/F 6a.

The image data of one page is then transferred from the page memory 5b to the page memory 6b. After completion of the transfer of the image data of one page, the DMAC 4 notifies the CPU 2a of completion of the transfer.

Upon receiving this notification, the CPU 2a instructs the image forming section 6 to drive the printer unit 100. In response to this instruction, the printer I/F 6a reads out the image data from the page memory 6b and outputs the image data to the printer unit 100. The printer unit 100 can print an image of the original document on a sheet based on the image data of one page.

An operation for creating a plurality of copies of an original document including a plurality of pages will now be described.

Upon receiving an instruction from the operation unit 2d, the CPU 2a instructs the image scanning section 5 to drive the scanner unit 200. In response to this instruction, the scanner I/F 5a stores image data of one page acquired by the scanner unit 200 in the page memory 5b. The scanner I/F 5a then notifies the CPU 2a of completion of scanning of the image data of one page.

Upon receiving this notification, the CPU 2a instructs the DMAC 4 to transfer the image data. The image data stored in the page memory 5b is sequentially written in the image memory 3b through the memory controller 3a.

The series of processing steps is repeated as many times as the number of the pages of the original document, whereby image data of all pages is stored in the image memory 3b.

The stored image data is then sequentially read out from the image memory 3b in accordance with an instruction of the CPU 2a and is transferred to the printer I/F 6a.

At this time, in response to storage of image data of one page in the page memory 6b from the image memory 3b by the DMAC 4, the CPU 2a instructs the printer I/F 6a to activate the printer unit 100.

After the printer I/F 6a transfers the image data of one page to the printer unit 100 in response to this instruction, the printer I/F 6a notifies the CPU 2a of completion of the transfer of the image data of the first page. Upon receiving this notification, the CPU 2a instructs the DMAC 4 to transfer image data of the next page. Printing of the image data is then started.

The series of processing steps is repeated as many times as the number of pages, whereby the first one copy of the original document is completed.

Since the CPU 2a is instructed to create a plurality of copies of the original document in this example, the CPU 2a instructs the DMAC 4 to transfer the image data of the first page to the printer I/F 6a from the image memory 3b again. Thereafter, the similar processing steps are repeated as many times as the specified number of copies, whereby a plurality of copies of the original document can be created.

An operation for printing a plurality of copies of print data contained in a print job received via a network will be described. Here, the print data is data of a plurality of pages.

The CPU 2a receives code data contained in the print job transmitted from a client terminal or the like with the communication section 8, which serves as an interface to an external network. The received code data is temporarily stored in the image memory 3b through the CPU bus 1 sequentially.

Upon completion of storage of code data of one page in the image memory 3b, the CPU 2a sequentially transfers the code data to the rendering unit 7a of the image rendering section 7 from the image memory 3b.

The rendering unit 7a renders the code data into image data that can be handled by each processing section using the work memory 7b provided along with the rendering unit 7a and writes the image data in the work memory 7b. The rendering unit 7a then notifies the CPU 2a of completion of rendering of the print job of one page.

As in the case of the copy operation, the CPU 2a instructs the DMAC 4 to transfer the rendered image data. The image data stored in the work memory 7b is sequentially written in the image memory 3b.

This series of processing steps is repeated as many times as the number of pages contained in the print job. In this manner, image data of all pages is stored in the image memory 3b.

The image data stored in the image memory 3b is sequentially read out from the image memory 3b in accordance with an instruction of the CPU 2a and is transferred to the printer I/F 6a.

At this time, once image data of one page is stored in the page memory 6b from the image memory 3b by the DMAC 4, the CPU 2a instructs the printer I/F 6a to activate the printer unit 100.

After the printer I/F 6a transfers the image data of one page to the printer unit 100 in response to this instruction, the printer I/F 6a notifies the CPU 2a of completion of the transfer of the image data of the first page. Upon receiving this notification, the CPU 2a instructs the DMAC 4 to transfer image data of the next page. Printing of the image data is then started.

As in the case of the copy operation, the series of processing steps is repeated as many times as the number of pages, whereby the first one copy of the print data is completed.

Since the CPU 2a is instructed to create a plurality of copies in this example, the CPU 2a instructs the DMAC 4 to transfer the image data of the first page to the printer I/F 6a from the image memory 3b again. By repeating the similar processing steps as many times as the specified number of copies thereafter, the plurality of copies can be printed.

Time needed by the rendering unit 7a to render the code data is decreasing thanks to a recent improvement in the rendering technique. Accordingly, when a plurality of copies are printed as in the above-described case, processing methods other than the method for rending and storing image data in the image memory 3b and reading out and using the stored image data may be employed to create the second and following copies. For example, there is a case where time for rendering code data of each page is shorter than predetermined time (e.g., time needed by the image forming section 6 to print the image data). In such a case, a technique for using smaller-size code data that is not rendered by the image rendering section 7 for data of the second and following copies is available (see Japanese Patent Laid-Open No. 2003-182164).

Code data that is sequentially written in the image memory 3b from the communication section 8 through the CPU bus 1 during a print job is a list of drawing instructions of objects existing in each page. In the related art, the print job data is stored as image data having undergone rendering of the rendering unit 7a. At the time of printing, the rendered image data is printed. However, since the above-described code data is easily edited (such as rotation, enlargement, reduction) for each object, the data processing apparatus 10000 may store both of the rendered image data and the code data.

Execution of a copy operation based on a copy function and execution of a print operation based on a print function may be requested at the same time in the data processing apparatus 10000 having the above-described configuration.

In such a case, two read/write operations (read processing and write processing) are executed in the image memory 3b. One is a read/write operation performed in the image memory 3b on image data transmitted from the image scanning section 5 during the copy operation. The other is a read/write operation performed on image data rendered by the image rendering section 7 during the print operation. When two read/write operations are simultaneously executed, the memory controller 3a has to perform time-division data transfer in the image memory 3b.

As a result, data transfer rates of the copy operation and the print operation may reduce and performance of both of the operations may drop.

In addition, for example, there may be a case where execution of a preview operation performed on unrendered code data stored in the image memory 3b and execution of a print operation are requested at the same time.

In such a case, both operations require rendering processing performed by the rendering unit 7a of the image rendering section 7 and the read/write operation of the work memory 7b. Accordingly, the image rendering section 7 has to sequentially execute these operations.

Thus, when the preview operation is requested during execution of the print operation, the preview operation may not be executed until the previously executed print operation is completed.

SUMMARY OF THE INVENTION

According to an aspect of the present invention, a data processing apparatus for causing a plurality of data processing units including a first data processing unit and a second data processing unit to process data of a job is provided that includes a storing unit configured to store data of a first job in a first data format and a second data format, processing of data in the first data format performed using the second data processing unit requiring longer time than processing of the data in the first data format performed using the first data processing unit, processing of data in the second data format performed using the first data processing unit requiring longer time than processing of the data in the second data format performed using the second data processing unit, a determining unit configured to determine whether to process the data in the first data format or the second data format in a case where the data of the first job stored in the storing unit is processed by the plurality of data processing units, and a control unit configured to cause the plurality of data processing units to process the data in the data format determined by the determining unit. The determining unit makes the determination based on whether processing of data of a second job performed using the first processing unit or processing of the data of the second job performed using the second processing unit requires longer time, the second job being executed in parallel to the first job.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments of the present invention and, together with the description, server to explain the principle of the invention.

FIGS. 4A through 4C are diagrams showing examples of header information registered in a job managing unit shown in FIG. 2.

FIGS. 5A and 5B are diagrams illustrating job management information managed by a job managing unit shown in FIG. 2.

FIGS. 8A and 8B are diagrams illustrating calculation executed by a resource processing calculating unit shown in FIG. 2.

FIG. 9 is a diagram showing a content of a priority management table shown in FIG. 7.

FIG. 11 is a diagram illustrating a memory map of a storage medium for storing various data processing programs that can be read by a data processing apparatus according to an exemplary embodiment of the present invention.

DESCRIPTION OF THE EMBODIMENTS

Exemplary embodiments of the present invention will be described below with reference to the accompanying drawings.

Figure 1:
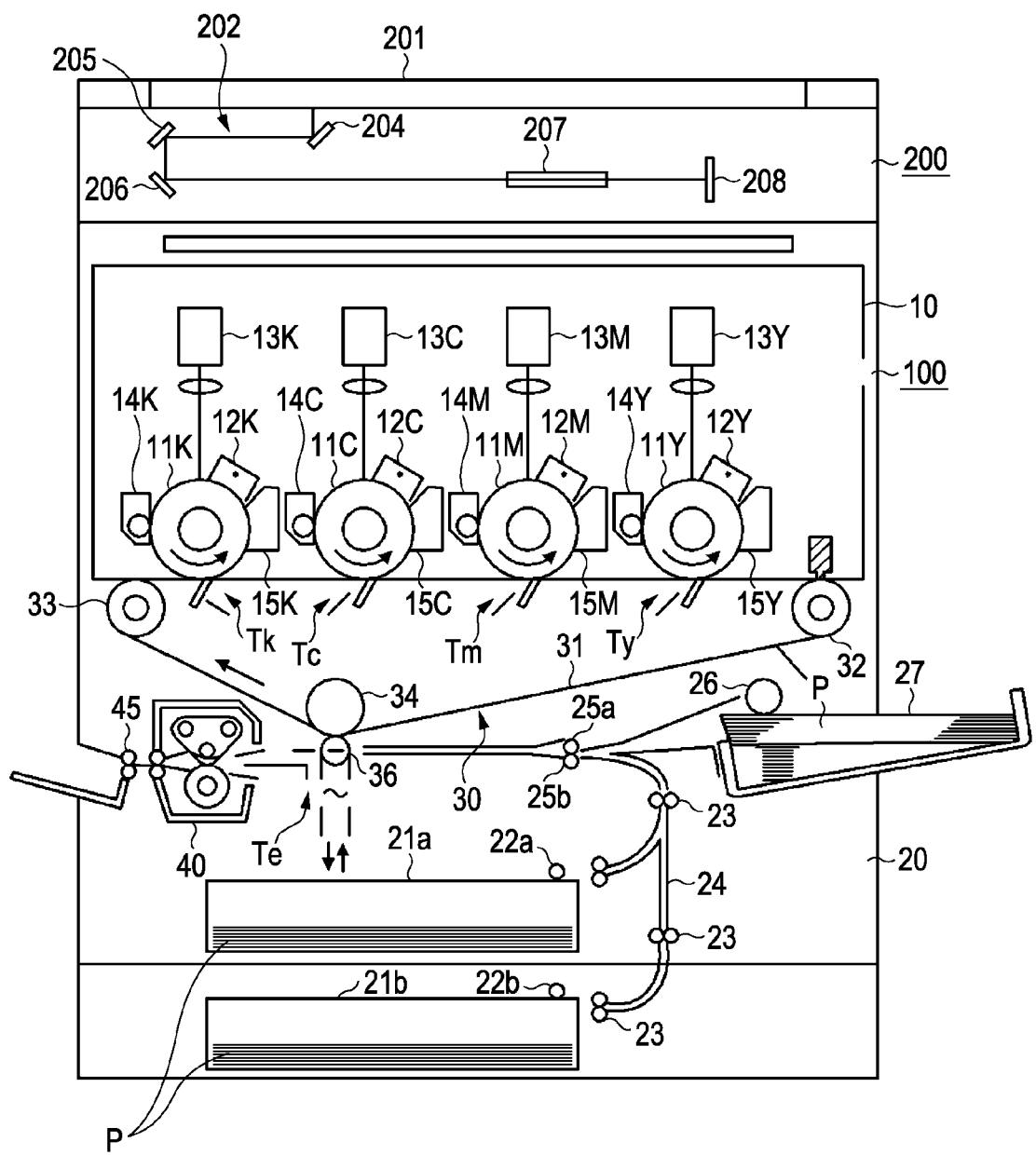
FIG. 1 is a sectional view showing an example of an image processing apparatus that employs a data processing apparatus according to an exemplary embodiment of the present invention.

A first exemplary embodiment of the present invention will be described below referring to the drawings. FIG. 1 is a sectional view showing an image processing apparatus serving as an example of a data processing apparatus according to an exemplary embodiment of the present invention. In this exemplary embodiment, the image processing apparatus is a multifunction peripheral (MFP), in which a scanner unit and a printer unit communicate with each other to carry out a scan function, a copy function, and a print function in parallel. The print function includes processing for analyzing a print job received from an information processing apparatus through a communication interface and rendering data contained in the print job.

Referring to FIG. 1, the image processing apparatus includes a scanner unit 200. The scanner unit 200 includes a document plate (platen glass) 201, a document scanning unit 202, a document illuminating lamp, not shown, and scanning mirrors 204 through 206. In response to start of image scanning processing in the scanning unit 200, the document scanning unit 202 reciprocates in a predetermined direction to scan an original document. During this period, an image of reflected light from the original document is formed on a charge coupled device (CCD) sensor included in an image sensor unit 208 through the scanning mirrors 204 through 206 and a lens 207.

An automatic document feeder or a pressing plate, not shown, is placed on the scanner unit 200.

A printer unit 100 mainly includes image forming units 10 (four image forming units for yellow (Y), magenta (M), cyan (C), and black (K) having the same configuration are provided in parallel), a sheet feeding unit 20, an intermediate transfer unit 30, a fixing unit 40, and a control unit, not shown.

A detailed description will be given for each unit.

The image forming unit 10 has the following configuration. Photosensitive drums 11Y, 11M, 11C, and 11K serving as image bearing members are held with shafts at the centers thereof and are rotatably driven in directions of arrows.

Primary chargers 12Y, 12M, 12C, and 12K, optical systems 13Y, 13M, 13C, and 13K, and developing devices 14Y, 14M, 14C, and 14K are arranged to face outer surfaces of the photosensitive drums 11Y, 11M, 11C, and 11K, respectively, along the rotation direction.

The primary chargers 12Y, 12M, 12C, and 12Y uniformly charge surfaces of the photosensitive drums 11Y, 11M, 11C, and 11K, respectively. The optical systems 13Y, 13M, 13C, and 13K illuminate light, such as, for example, laser beam, that is modulated in accordance with a recording image signal onto the photosensitive drums 11Y, 11M, 11C, and 11K to form electrostatic latent images, respectively.

The developing devices 14Y, 14M, 14C, and 14K containing four developers (toners) of yellow (Y), magenta (M), cyan (C), and black (K) develop the electrostatic latent images, respectively. On the downstream sides of image transfer areas Ty, Tm, Tc, and Tk where the developed visible images are transferred onto an intermediate transfer member, cleaning devices 15Y, 15M, 15C, and 15K sweep away the toners that are not transferred to a transfer belt 31 but remain on the photosensitive drums 11Y, 11M, 11C, and 11K, respectively. In this manner, the surfaces of the drums are cleaned. Image forming is sequentially performed with each of the toners in the above-described process. The transfer belt 31 is rotatably moved by rollers 32, 33, and 34.

The sheet feeding unit 20 has cassettes 21a and 21b for storing sheets P and a manual feed tray 27. The sheet feeding unit 20 also has pickup rollers 22a, 22b, and 26 for feeding the sheet P from the cassettes 21a and 21b and the manual feed tray 27 one by one, respectively. Furthermore, the sheet feeding unit 20 has pairs of sheet feeding rollers 23 and a sheet feeding guide 24 for conveying the sheet P fed from the respective pickup rollers 22a, 22b, and 26 to register rollers 25a and 25b. The sheet feeding unit 20 also has the register rollers 25a and 25b for feeding the sheet P to a secondary transfer area Te in synchronization with image forming timing of the image forming unit 10.

The control unit has a control board, not shown, for controlling operations of the mechanism of each of the above-described units and a motor drive board, not shown.

The fixing unit 40 applies heat and pressure on the sheet P on which an image is transferred by a transfer roller 36 at the secondary transfer area Te to fix the image. The sheet P having the fixed image thereon is discharged by a discharge roller 45. The image forming operation then terminates. If the printer unit 100 has a duplex printing unit, the sheet is reversed and re-fed through a re-feeding path.

Figure 2:
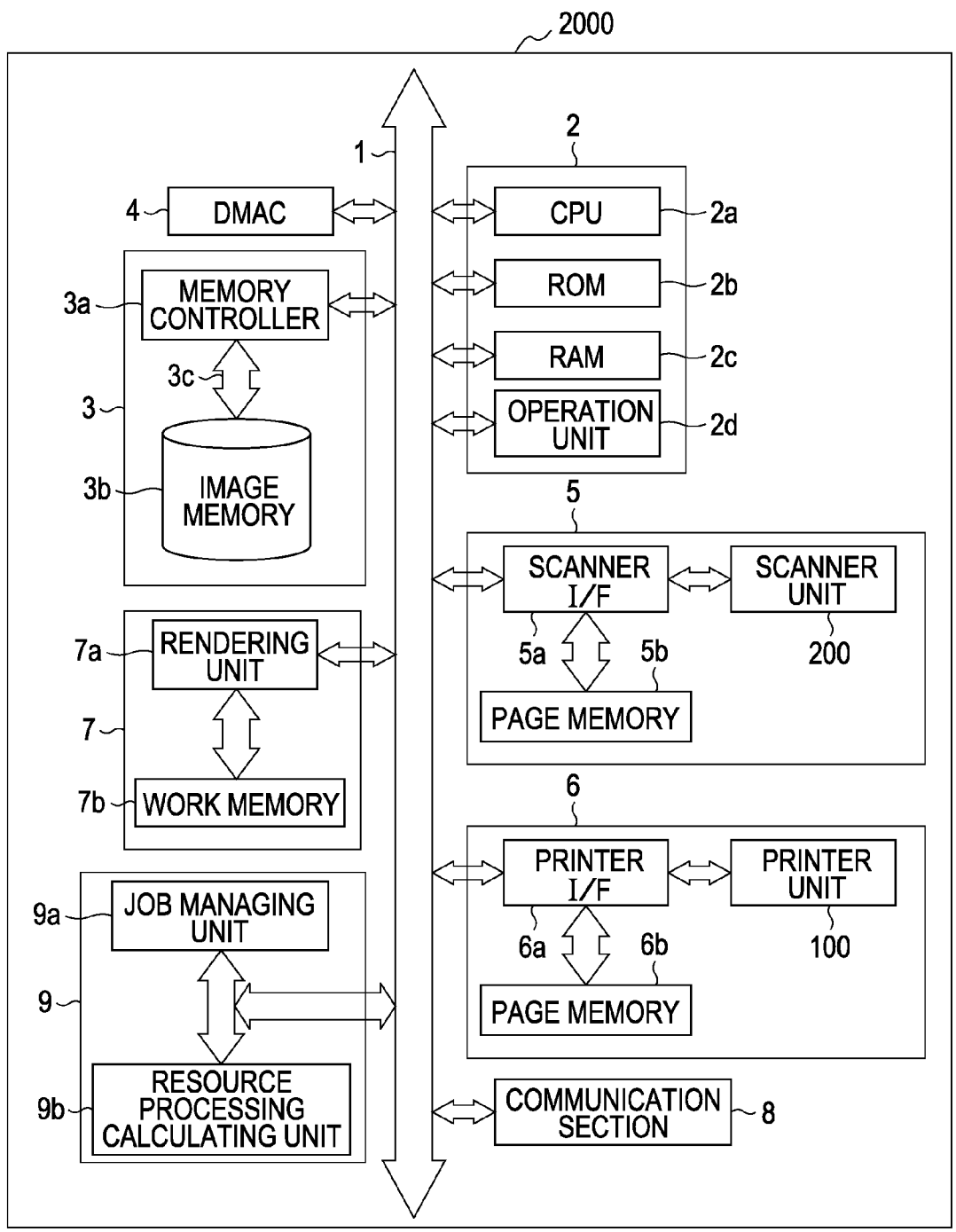
FIG. 2 is a block diagram illustrating a configuration of a data processing apparatus according to an exemplary embodiment of the present invention.

FIG. 2 is a block diagram illustrating a configuration of an image processing apparatus 2000 according to an exemplary embodiment of the present invention.

Referring to FIG. 2, the image processing apparatus 2000 has a central processing unit (CPU) bus 1. The CPU bus 1 is connected to a system control section 2, a memory control section 3, a direct memory access controller (hereinafter, abbreviated as DMAC) 4, an image scanning section 5, an image forming section 6, an image rendering section 7, a communication section 8, and a data selecting section 9.

The system control section 2 connected to the CPU bus 1 has a CPU 2a, a read-only memory (ROM) 2b, a random access memory (RAM) 2c, and an operation unit 2d. The CPU 2a is an integrated circuit (IC) for controlling the image processing apparatus 2000. A control program is stored in the ROM 2b. The RAM 2c is a memory temporarily used by the CPU 2a to execute arithmetic processing and to execute the control program.

For example, in response to output of a control command, such as an activation command of the image scanning section 5, the image forming section 6, and the image rendering section 7, the CPU 2a writes the control command in the RAM 2c. Upon receiving a notification of completion of writing of image data or the like, the CPU 2a determines whether this notification corresponds to the control command.

The operation unit 2d serves as an interface between a user and the image processing apparatus 2000. In response to an instruction entered through the operation unit 2d, the CPU 2a executes predetermined data processing. A memory controller 3a connected to the CPU bus 1 is an interface to an image memory 3b, which has a relatively large capacity capable of storing data of a plurality of pages. The memory controller 3a and the image memory 3b are connected by a memory bus 3c. The operation unit 2d has a function for processing a preview request of image data stored in the image memory 3b supplied through a user interface, not shown.

Although not shown, encoded data is also stored by performing encoding processing. The DMAC 4 executes data transfer between devices without through the CPU 2a. The DMAC 4 can realize data transfer at a higher rate than the CPU 2a.

The image scanning section 5 connected to the CPU bus 1 processes data of an original document scanned by the document scanning unit 202 of the above-described scanner unit 200. The image scanning section 5 includes a scanner interface (I/F) 5a, a scanner unit 200, and a page memory 5b.

The scanner I/F 5a controls driving of the scanner unit 200 and controls writing and reading of image data (DATA) in the page memory 5b. The page memory 5b stores image data of one page supplied from the scanner unit 200. The page memory 5b is used to adjust data transfer rates of the scanner unit 200 and the CPU 2a and improve utilization efficiency of the CPU bus 1.

The image rendering section 7 connected to the CPU bus 1 receives a print job created with appropriate application software from a client terminal connected to a network through the communication section 8. A rendering unit 7a of the image rendering section 7 renders code data contained in the print job using a work memory 7b to convert the code data into data that can be handled by each processing section connected to the CPU bus 1. The rendering unit 7a can convert the code data into bitmap-format image data. In addition, the image rendering section 7 can receive code data stored in the image memory 3b and execute the similar processing on the code data.

The image forming section 6 connected to the CPU bus 1 inputs the processed image data to the above-described printer unit 100. The image forming section 6 has a printer interface (I/F) 6a, a page memory 6b, and a printer unit 100. The image forming section 6 executes printing processing in response to a print request for printing image data stored in the image memory 3b or image data rendered by the rendering unit 7a.

The printer I/F 6a controls driving of the printer unit 100 and controls writing and reading of image data in the page memory 6b. The page memory 6b stores image data of one page to be written in the printer unit 100. The page memory 6b is used to adjust data transfer rates of the printer unit 100 and the CPU 2a and improve utilization efficiency of the CPU bus 1.

The data selecting section 9 connected to the CPU bus 1 has a job managing unit 9a and a resource processing calculating unit 9b. The job managing unit 9a simultaneously manages job information of a copy operation for loading document data from the above-described scanner section 200 and copying the document data and job information of a print operation for rendering and printing a print job.

The job managing unit 9a also manages a facsimile job for outputting facsimile data supplied from an external telephone line, not shown.

The job managing unit 9a manages, as one job, a preview operation that is performed when a user wants to preview image data previously stored in the image memory 3b through the operation unit 2d.

The resource processing calculating unit 9b calculates a usage state of each resource of the image processing apparatus 2000 and processing time of each resource based on the job information managed by the job managing unit 9a. The resources indicate the image rendering section 7 included in the image processing apparatus 2000, a data reading/writing processing unit in the image memory 3b, and so forth.

More specifically, the resource processing calculating unit 9b calculates transfer time for reading/writing data in the image memory 3b and rendering time of the image rendering section 7.

A case where the image processing apparatus 2000 having the above-described configuration sequentially executes a print operation and a copy operation will be described. Here, the print operation is an operation for printing code data (vector data) for edition previously stored in the image memory 3b or bitmap data corresponding to the rendered code data.

Figure 3:
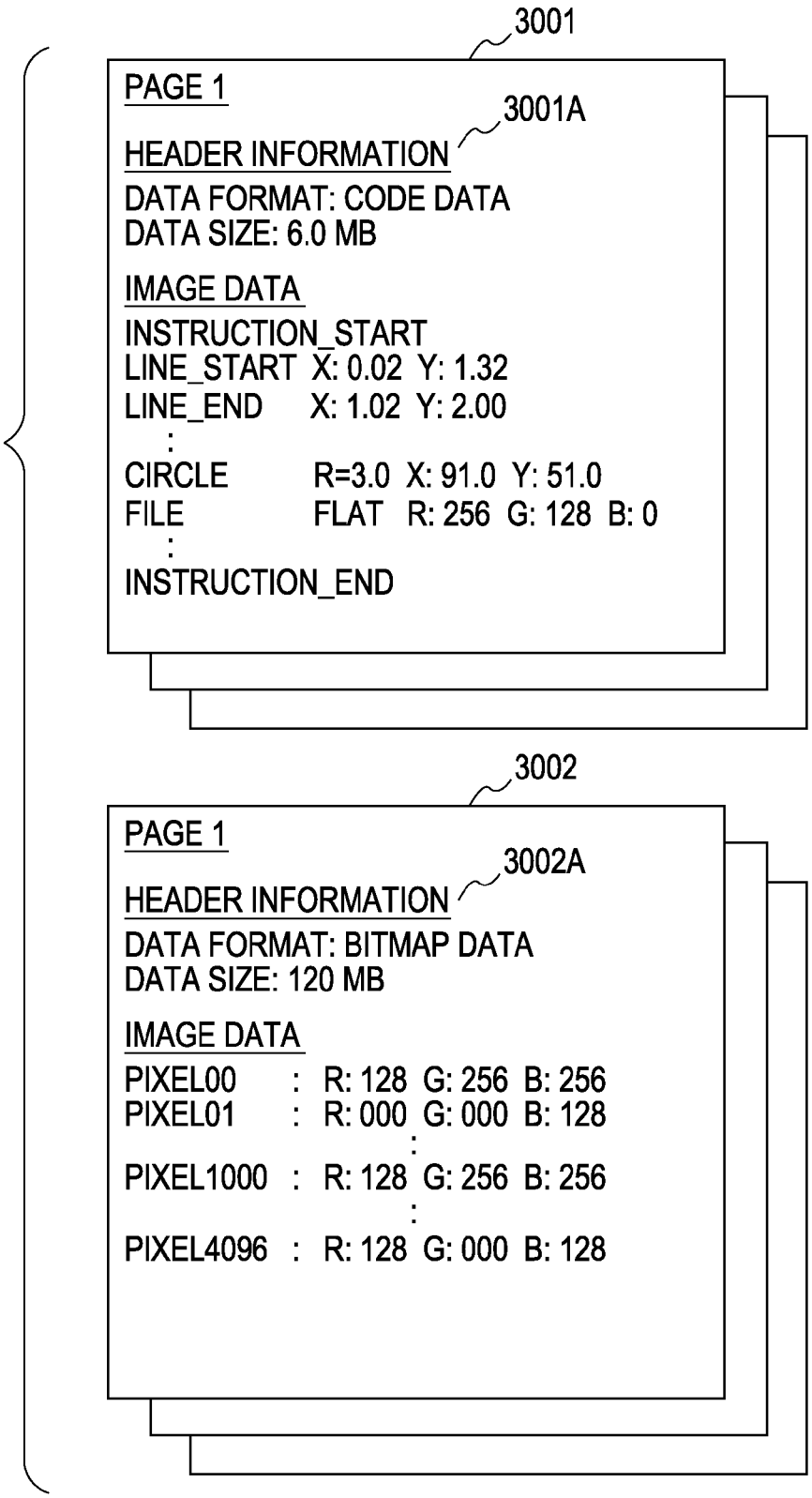
FIG. 3 is a diagram schematically showing code data for edition stored in an image memory shown in FIG. 2 and bitmap data rendered based on the code data.

FIG. 3 is a diagram schematically showing code data 3001 for edition stored in the image memory 3b shown in FIG. 2 and bitmap data 3002 rendered based on the code data.

Referring to FIG. 3, the code data (vector data) 3001 is a list of objects contained in print data and rendering commands for the above-described rendering unit 7a. In this example, the code data 3001 includes header information, figures, such as a line and a circle, and drawing commands, such as colors of the figures. Here, header information 3001A contains a data format and a data size.

The bitmap data 3002 for printing is generated by rendering the code data 3001 with the image rendering section 7. Here, header information 3002A contains a data format and a data size.

As shown by this example, the bitmap data is a list of pixel values obtained by dividing the code data using the resolution of the printer unit and color information of each divided pixel.

In this exemplary embodiment, it is assumed that either format has header information for identifying the data and the header information contains the data format and the data size.

In response to a print command of the code data 3001 or the bitmap data 3002, the header information of the data is transferred to the job managing unit 9a of the data selecting section 9 and is registered as a job. Upon receiving a print request of print-target data selected by a user, the CPU 2a determines whether code data corresponding to the print-target data exists and whether bitmap data corresponding to the print-target data exists. If the CPU 2a determines that both of the code data and the bitmap data exist, the CPU 2a selects data to be used in printing based on data processing time. The data processing time differs from one another depending on the data size, time for rendering executed by the image rendering section 7, and time for reading/writing data from/in the image memory 3b. Accordingly, CPU 2a determines the data processing time based on such items.

FIGS. 4A through 4C are diagrams showing examples of header information registered in the job managing unit 9a shown in FIG. 2. This example shows a case of storing job management information for each processing request.

FIG. 4A shows a state where a job "JOB1" is registered at a job number 4001. Similarly, FIGS. 4B and 4C show states where jobs "JOB1" and "JOB2" are registered at the job number 4001. Here, "JOB2" shown in FIGS. 4B and 4C indicates different jobs.

Referring to FIGS. 4A through 4C, a "memory print" job shown at a job type 4002 is registered as "JOB1" at the job number 4001 in response to a print request. The "memory print" job is for printing data stored in the image memory 3b on a sheet with the image forming section 6. For example, the CPU 2a stores code data contained in a print job received from an external apparatus, such as a client computer, through the communication section 8 in the image memory 3b. The CPU 2a also renders the code data temporarily stored in the image memory 3b with the rendering unit 7a at a predetermined timing and stores the rendered bitmap-format image data in the image memory 3b. In this manner, data of one job can be stored in the image memory 3b in a plurality of formats. The predetermined timing may be timing that the rendering unit 7a is not used for other processing. The user can select data of a desired data format from the pieces of data of the plurality of formats stored in the image memory 3b and instruct printing or preview of the selected data.

The CPU 2a also registers information on a data format 4003, a data size 4004, and a page number to be processed 4005 based on the header information attached to the code data.

The resource processing calculating unit 9b then calculates time needed for processing the data registered in the job managing unit 9a using each resource.

FIGS. 5A and 5B are diagrams illustrating job management information managed by the job managing unit 9a shown in FIG. 2. This example shows a case of storing job management information for each processing request.

Referring to FIGS. 5A and 5B, a job number 5001 shows a number for identifying a registered job. The job number is assigned to a job in response to registration of the job.

In this exemplary embodiment, a page number 5002, a data format 5003, an image memory (READ) 5004, an image memory (WRITE) 5005, rendering processing 5006 are managed for each job number 5001. The image memory (READ) 5004 indicates time needed for reading out data from the image memory 3b. For example, in a case of a memory print job, since the data stored in the image memory 3b has to be read out to print the data, the time needed for readout is recorded at the image memory (READ) 5004. The value recorded at the image memory (READ) 5004 is calculated by the resource processing calculating unit 9b based on data read rates of the CPU 2a and the DMAC 4 and a size of data to be read out. A copy operation is performed by writing a data of an original document scanned by the scanner unit 200 in the image memory 3b and reading out the written image data. However, regarding the copy operation, time needed for reading out/writing in the image data is not recorded at the image memory (WRITE) 5005 but is recorded at the image memory (READ) 5004. Time needed for a memory store job for storing data received from an external apparatus or data scanned by the scanner unit 200 in the image memory 3b is recorded at the image memory (WRITE) 5005.

The rendering processing 5006 indicates time needed for rendering code data to print the code data. For example, since rendering has to be performed when code data stored in the image memory 3b is printed, time needed for rendering the code data is recorded at the rendering processing 5006. The resource processing calculating unit 9b calculates a value recorded at the rendering processing 5006 based on a rendering capability of the image rendering section 7 and a size of image data to be rendered. Since the size of code data is smaller than that of bitmap data when the code data and the bitmap data contain similar image data, time for reading out and writing the code data from and in the image memory 3b is shorter.

FIG. 5a is a diagram for illustrating a usage state of each resource determined based on the job type 4002 shown in FIGS. 4A through 4C and calculated resource processing time. In this exemplary embodiment, a description will be given for time needed for processing data using each resource in a print job.

As shown in FIG. 5A, time for processing data registered as the job number "JOB1" using each resource is calculated for each page based on the data registered in the job managing unit 9a.

Referring to FIG. 5A, a resource that is not used is denoted as "NONE".

The data selecting section 9 selects a data format used in printing for each page in a manner described below based on the data calculated by the resource processing calculating unit 9b.

A case where a user specifies code data and requests printing of the code data of JOB1 will be described.

The example of FIG. 5A shows information to be used when the CPU 2a has completed printing of page 4 of the JOB and is about to start processing page 5.

Regarding the page 5 of JOB1, time for reading out the code data from the image memory 3b is shorter than time for reading out bitmap data from the image memory 3b. This is because the size of the code data is smaller than that of the bitmap data corresponding to the code data. More specifically, in the case of JOB1, the time for reading out the code data is 10 msec. However, the code data has to be rendered in order to be printed. In the example shown in FIG. 5A, the resource processing calculating unit 9b determines that 125 msec is needed for rendering. As shown in FIG. 5A, bottleneck of the printing processing of JOB1 is the rendering processing 5006 when the data format 5003 is the code data.

On the other hand, when the bitmap data is used in printing, the bottleneck is the image memory (READ) 5004, which is 100 msec. Accordingly, the data selecting section 9 selects the bitmap data that can be processing with a shorter time period based on a result "100 msec<125 msec". That is, when the CPU 2a prints the page 5 of JOB1 by executing JOB1, the CPU 2a controls the DMAC 4 to transfer the bitmap data to the image forming section 6. The image forming section 6 prints the transferred bitmap data.

In this manner, the data selecting section 9 determines the data format to be used in printing processing for each of pages contained in the job. More specifically, the job managing unit 9a of the data selecting section 9 sends a data selection signal based on selected data format information for each page to the CPU 2a in response to each page call request of the CPU 2a.

In this manner, the CPU 2a sets a start address of an area storing data of the selected data format as a read address in the DMAC 4. Accordingly, the print data of the appropriate data format (in this case, the bitmap data) is called.

The called data is processed by each resource through the CPU bus 1 at a predetermined path depending on the data format in the above-described manner and is ultimately transferred to the printer I/F 6a.

At this time, in response to storage of image data of one page in the page memory 6b from the image memory 3b by the DMAC 4, the CPU 2a instructs the printer I/F 6a to activate the printer unit 100.

In response to this instruction, the printer I/F 6a outputs the image data of one page to the printer unit 100 from the page memory 6b. After the output of the image data, the printer I/F 6a notifies the CPU 2a of completion of printing of the first page. Upon receiving this notification, the CPU 2a instructs the DMAC 4 to transfer image data of the next page. The instruction to transfer the image data of the next page may be given before the completion of printing of the previous page, whereby printing of the next page may be started earlier.

Although a plurality of copies completes by repeating the above-described processing as many times as the number of pages, a description will be given for a case where a copy job is entered during execution of a print job to show a further advantage based on the configuration of this exemplary embodiment.

Here, the copy job corresponds to "JOB2" listed at the job number 4001 in FIG. 4B.

In response to a copy instruction supplied from the operation unit 2d, the CPU 2a instructs the image scanning section 5 to drive the scanner unit 200. Upon receiving this instruction, the scanner I/F 5a drives the scanner unit 200 to scan image data of an original document with the scanner unit 200 and stores the scanned image data in the page memory 5b.

After storage of the image data of one page in the page memory 5b, the scanner I/F 5a notifies the CPU 2a of completion of scanning of the image data.

At this time, job information of one page is registered in the job managing unit 9a of the data selecting section 9. Accordingly, the state of the job management information registered in the job managing unit 9a is shifted to the state shown in FIG. 4B from the state shown in FIG. 4A.

Referring to FIG. 4B, a copy operation JOB2 (copy: page 1) is newly registered in addition to job information (JOB1: memory print: page 5) to be executed next.

The resource processing calculating unit 9b then performs the similar calculation based on the registered job information of the job number JOB2 in the above-described manner.

FIG. 5B shows resource processing time calculated by the resource processing calculating unit 9b based on the job information of "JOB2" newly added at the job number 5001.

The image memory (READ) 5004 for processing the bitmap data of "JOB1" registered at the job number 5001, where only one job is registered in FIG. 5A, is changed from "100" msec to "200" msec. Here, the image memory (READ) 5004 indicates time for reading out one page.

The reason why "100" msec is changed to "200" msec is that the job information of "JOB2" is additionally registered at the job number 5001 and a band of the memory bus 3c of the image memory 3b is occupied due to simultaneous execution. More specifically, as a result of simultaneous execution of read/write operations of pages of "JOB1" and "JOB2" registered at the job number 5001 in the image memory 3b, the value of the image memory (READ) 5004 is changed from "100" msec to "200" msec. These values are calculated by the resource processing calculating unit 9b.

In this exemplary embodiment, it is assumed that bus arbitration of the memory controller 3a for accessing the image memory 3b is evenly assigned to the read/write operation of each data.

As described above, the read time, shown at the image memory (READ) 5004, for the bitmap data of page 5 of "JOB1" registered at the job number 5001 drops to "200" msec. Accordingly, the data selecting section 9 selects, as data that can be processed faster, code data to be rendered by the rendering unit 7a.

On the other hand, since only bitmap data is generated in the copy operation "JOB2" registered at the job number 5001, the data selecting section 9 does not select the data format. The processing is performed on the bitmap data thereafter.

If the code data is selected as the processing-target data of "JOB1" registered at the job number 5001, the data selecting section 9 executes the following process as in the case described regarding the single job. More specifically, the data selecting section 9 sends a data selection signal to the CPU 2a based on selected data format information for each page (in this case, the code data) in response to each page call request of the CPU 2a.

In this manner, the CPU 2a sets a start address of an area storing data of the selected data format as a read address in the DMAC 4. Accordingly, the print data of the appropriate data format is called. The data called in this manner is processed by each resource at a desired path and is printed by the printer unit 100.

Figure 6:
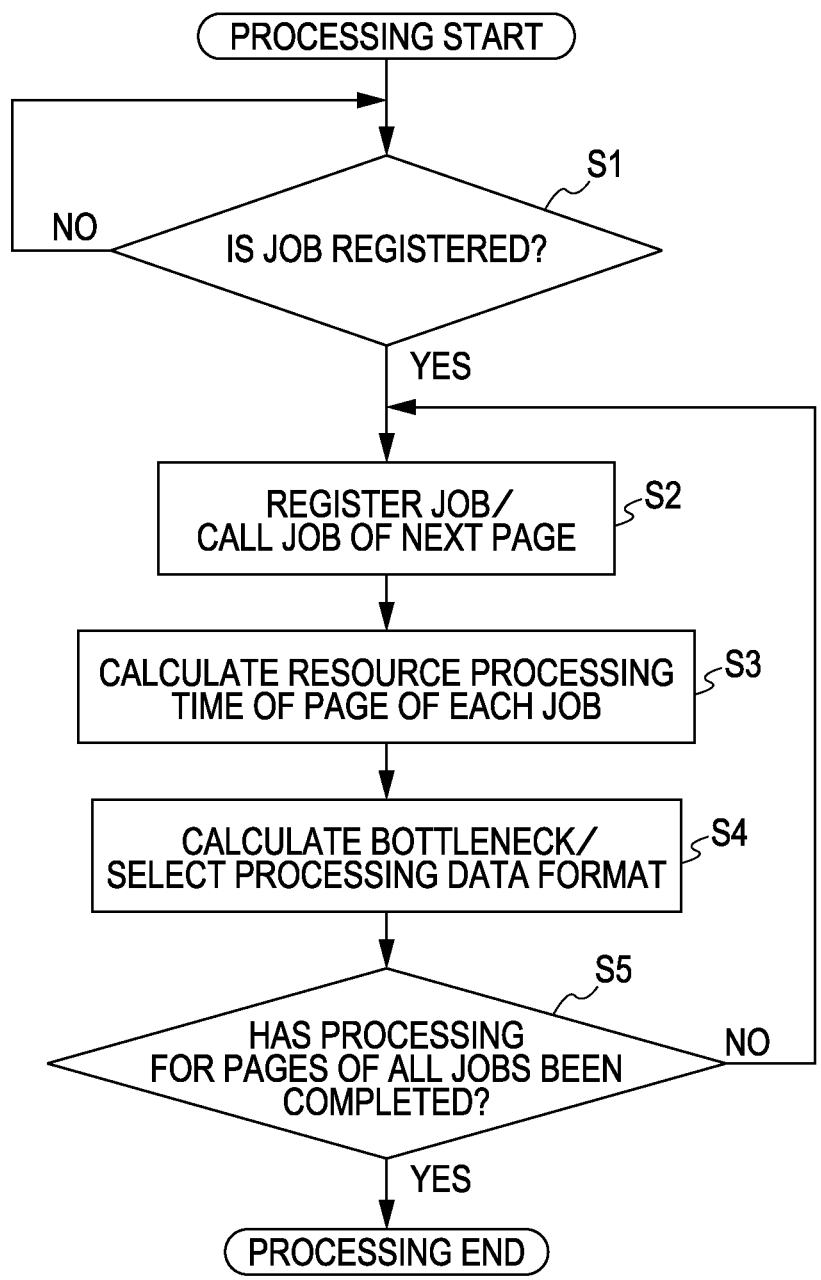
FIG. 6 is a flowchart showing an example of a first data processing procedure executed by a data processing apparatus according to an exemplary embodiment of the present invention.

FIG. 6 is a flowchart showing an example of a first data processing procedure executed by the CPU 2a and the data selecting section 9 of the image processing apparatus 2000 according to an exemplary embodiment of the present invention. This example shows processing for dynamically determining a data processing format of a job in accordance with a data processing format selected by the data selecting section 9 when the CPU 2a processes the job. The CPU 2a and the data selecting section 9 load a control program stored in the ROM 2b to the RAM 2c and execute the control program, thereby realizing each of steps S1 through S5.

At S1, the job managing unit 9a determines whether a job is registered in the image processing apparatus 2000 with reference to a table shown in FIGS. 4A through 4C upon receiving a job execution request. If the job managing unit 9a determines that the job is registered in the table shown in FIGS. 4A through 4C, the process proceeds to S2, if a determination is made that the job is not registered, the job registration determination is repeated.

At S2, the job managing unit 9a calls header information from a start page of data of the job. The job managing unit 9a sequentially registers the job type 4002, the data format 4003, the data size 4004, and the page number 4005.

At S3, the resource processing calculating unit 9b calculates resource processing time of each registered page number based on all pieces of job information registered in the job managing unit 9a.

At S4, each resource processing time is compared based on the result calculated by the resource processing calculating unit 9b for each job to determine a bottleneck.

The data selecting section 9 then selects a data format that can reduce the calculated bottleneck processing time and sends a data selection signal indicating the selected data format to the CPU 2a.

In this manner, the CPU 2a sets a start address of the data format to be called in the DMAC 4 to start processing the data of the appropriate data format.

At S5, after the selection of the data format of one page, the job managing unit 9a determines whether the data selection for pages of all of the registered jobs has been completed.

If the job managing unit 9a determines that the data selection has been completed for pages of all of the jobs, the process terminates.

If the job managing unit 9a determines that the data selection has not been completed for pages of all of the jobs at S5, the process returns to S2. Then, processing starting from calling of header information of the next page is repeated.

When the data format selection has completed for pages of all of the registered jobs, the operation of the data processing system terminates in response to completion of the data format selection and processing of the job.

As described above, even when a new job is entered, the image processing apparatus 2000 according to this exemplary embodiment dynamically calculates processing time for each page of each job in consideration for a plurality of pieces of job information. The image processing apparatus 2000 then selects and processes a data format used in each job based on the calculated processing time. In this manner, the image processing apparatus 2000 can improve processing efficiency.

Figure 7:
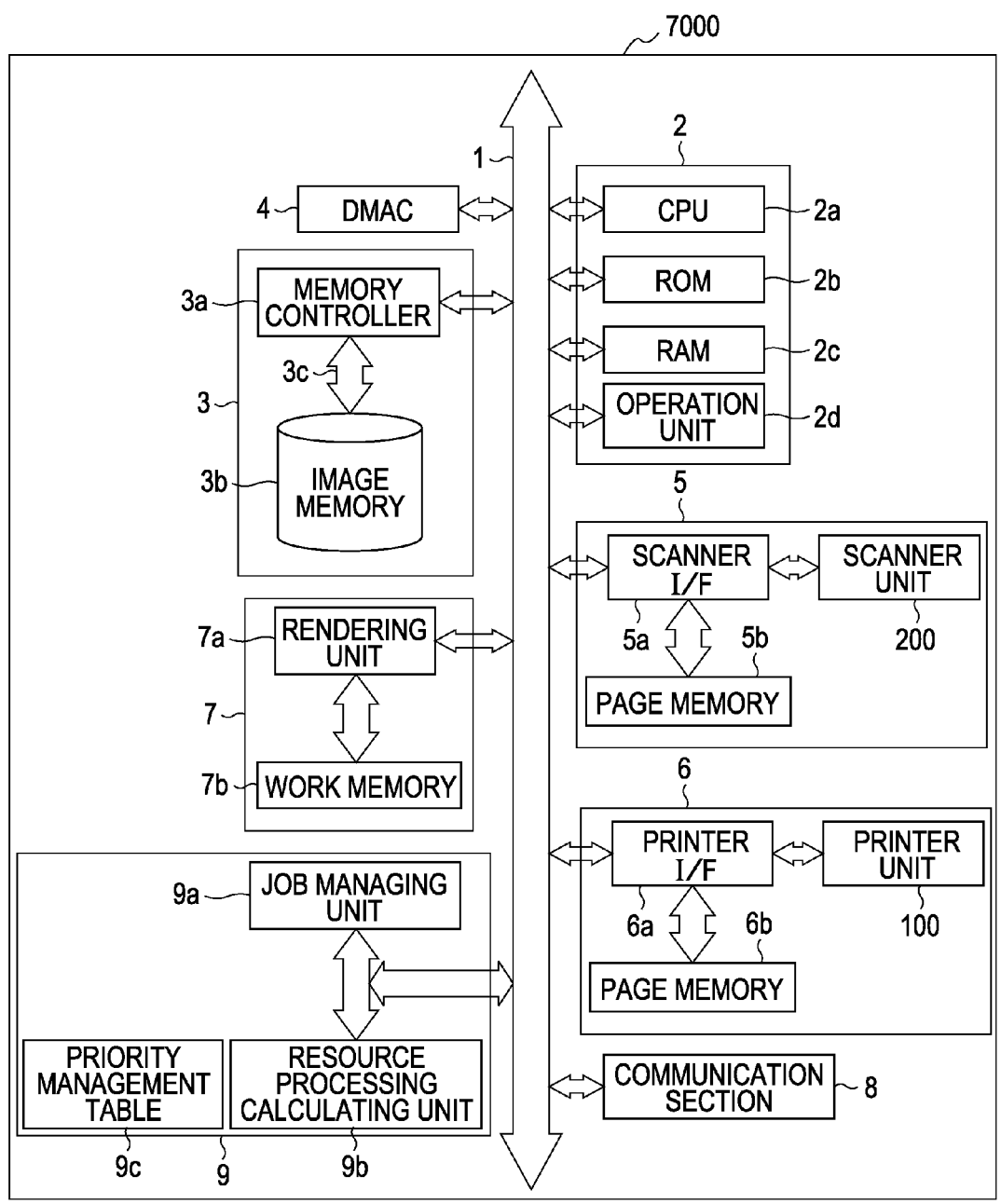
FIG. 7 is a block diagram illustrating a configuration of a data processing apparatus according to an exemplary embodiment of the present invention.

A second exemplary embodiment of the present invention will be described below referring to the drawings. FIG. 7 is a block diagram illustrating a configuration of an image processing apparatus 7000 according to an exemplary embodiment of the present invention. In this exemplary embodiment, the image processing apparatus 700 processes image data supplied from a scanner unit 200 and a communication section 8, which will be described later, and outputs the processed image data. Similar or like references designate configurations of the image processing apparatus 7000 according to this exemplary embodiment that are similar to those of the image processing apparatus 2000 having been described in the first exemplary embodiment and a detailed description thereof is omitted.

As shown in FIG. 7, in this exemplary embodiment, a data selecting section 9 of the above-described image processing apparatus 7000 has a priority management table 9c for storing a job priority of each job type in addition to a job managing unit 9a and a resource processing calculating unit 9b.

A description will be given below for a case where a preview operation is executed after a printing operation in this exemplary embodiment.

As in the case of the first exemplary embodiment, header information of print data is temporarily transferred to the job managing unit 9a of the data selecting section 9 and is registered as a job in response to a print command of the print data.

As in the case of the first exemplary embodiment, FIG. 4A shows the content of the registered header information. A job whose job type 4002 is memory print is registered as JOB1 at the job number 4001 in response to a print command as shown in FIG. 4A.

Information on the data format 4003, the data size 4004, and the page number to be processed 4005 is also registered based on the header information attached to the code data.

The resource processing calculating unit 9b determines time for using each resource to process the data registered in the job managing unit 9a in consideration for a usage state of the resource.

FIGS. 8A and 8B are diagrams illustrating calculation executed by the resource processing calculating unit 9b shown in FIG. 7.

FIG. 8A shows processing time for using each resource determined for each job type and information on a processing priority 5007 that is added as a new parameter according to this exemplary embodiment.

As shown in FIG. 8A, time for processing the print data registered as "JOB1" at the job number 5001 using each resource is calculated for each page based on the data registered in the job managing unit 9a. As described above, resources not used in each job are denoted as "NONE".

In this exemplary embodiment, the priority indicating a job to be preferentially executed is set for each job type 4002.

FIG. 9 is a diagram showing a content of the priority management table 9c shown in FIG. 7.

As shown in FIG. 9, in this exemplary embodiment, the job type is stored in association with the priority thereof. In this exemplary embodiment, a plurality of job types may have the same priority or all job types may have different priorities.

The priority contained in the priority management table 9c may be referred to by a user through the operation unit 2d and changed if necessary or may be previously determined at the time of factory shipment.

Accordingly, when a plurality of jobs are registered as jobs to be executed, the data selecting section 9 calculates the priority for executing the job as a parameter with reference to the priority management table 9c.

When a single job (in this case, a memory print job) is registered, the priority of the registered job is determined to be 1 as shown in FIG. 8A regardless of the job type.

The data selecting section 9 selects a data format to be used for each page based on the data calculated in this manner.

For example, regarding page 5 of this job, bottleneck processing is read time (in this case, 150 msec) shown at the image memory (READ) 5004 in FIG. 8A. In this case, processing time for rendering processing 5006 executed by the rendering unit 7a (60 msec) is shorter.

Accordingly, the data selecting section 9 selects code data as the data format of the job number JOB1. In this manner, the data to be used in printing processing is sequentially selected for each page as in the case of the first exemplary embodiment. The data (in this case, the code data) selected by the data selecting section 9 is read out from the image memory 3b for each page. After execution of predetermined processing, the processed image data is sequentially transferred to the printer I/F 6a.

Upon the image data of one page being transferred to the printer unit 100, the CPU 2a is notified of completion of transfer of the image data of one page. Upon receiving this notification, the CPU 2a instructs the DMAC 4 to transfer image data of the next page to continue a printing operation of a plurality of pages.

By repeating the above-described processing as many times as the number of pages, printing of a plurality of copies completes. Processing executed under the following circumstance will now be described to describe a further advantage of this exemplary embodiment. More specifically, a case where a user newly requests execution of a preview job for previewing code data stored in the image memory 3b during execution of the above-described memory print job will be described.

The user selects data stored in the image memory 3b through the operation unit 2d to execute a preview operation.

In response to the request, the CPU 2a registers job information of the selected code data stored in the image memory 3b in the job managing unit 9a of the data selecting section 9. FIG. 4C shows job managing information registered at this time.

In this state, as shown in FIG. 4C, a preview operation JOB2 (preview: page 1) is newly registered at the job type 4002 in addition to job information (JOB1: memory print: page 5) to be executed next. The data format 4003, the data size 4004, and the page number 4005 of "JOB2" registered at the job number 4001 are stored as processing information based on header information of the corresponding code data.

As described above, the resource processing calculating unit 9b performs the similar calculation based on the job information registered in the job managing unit 9a. The resource processing calculating unit 9b also determines the priority of each job with reference to the priority management table 9c based on the registered job type.

FIG. 8B shows processing time calculated by the resource processing calculating unit 9b based on the additionally registered job.

As in the case of the first exemplary embodiment, time for using each resource is shown in association with the priority for each of the registered jobs.

FIG. 8B reveals that processing time for processing code data of one page of "JOB1" registered at the job number 5001 by the rendering unit 7a is changed to 120 msec from 60 msec.

This is because "JOB2" is additionally registered at the job number 5001 and the rendering operation has to be performed on the pages of "JOB1" and "JOB2" at the same time using the rendering unit 7a.

In this exemplary embodiment, it is assumed that time-division rendering processing is performed on a plurality of pieces of data in units of predetermined time in the rendering unit 7a.

In this manner, when only "JOB1" is registered at the job number 5001, the data selecting section 9 selects the code data as the data of page 5. When "JOB2" is newly registered at the job number 5001, a read operation (155 msec) of bitmap data from the image memory 3b becomes a bottleneck.

However, comparison of values of the newly added processing priority 5007 that is managed in the table shown in FIGS. 8A and 8B reveals that the priority of the preview operation of "JOB2" registered at the job number 5001 is determined to be the highest, namely, "1". Accordingly, the CPU 2a has to preferentially process the job having the job number 5001 "JOB2" than the job having the job number 5001 "JOB1".

Accordingly, the data selecting section 9 preferentially uses the priority of the job type than the resource processing time calculated by the resource processing calculating unit 9b to select data of each job so that "JOB2" registered at the job number 5001 is preferentially processed.

In this case, rendering processing of the job "JOB2" having the highest priority registered at the job number 5001 takes some time. Accordingly, it is preferable to avoid the rendering processing in "JOB1" registered at the job number 5001. Accordingly, the data selecting section 9 selects bitmap data that does not require the rendering processing regarding "JOB1" registered at the job number 5001.

The data selecting section 9 sends a signal indicating that the bitmap data is selected for "JOB1" registered at the job number 5001 to the CPU 2a.

The CPU 2a sets a start address of an area storing the data of the selected data format as a read address in the DMAC 4. In this manner, print data of the appropriate data format (in this case, the bitmap data) is called.

In this manner, the data format of the job "JOB1" registered at the job number 5001 is changed from the code data to the bitmap data. As a result, the rendering processing of the rendering unit 7a is not performed on the job having the job number 5001 "JOB1" and the code data of "JOB2" registered at the job number 5001 is preferentially processed.

Accordingly, the code data of "JOB2" registered at the job number 5001 is rendered at a high speed by the rendering unit 7a. After the image data rendered by the rendering unit 7a is loaded to the RAM 2c, preview of drawing information of the code data selected by the user is displayed on the operation unit 2d by a display driver, not shown.

A flow of the above-described processing according to the second exemplary embodiment will be described using a flowchart shown in FIG. 10.

Figure 10:
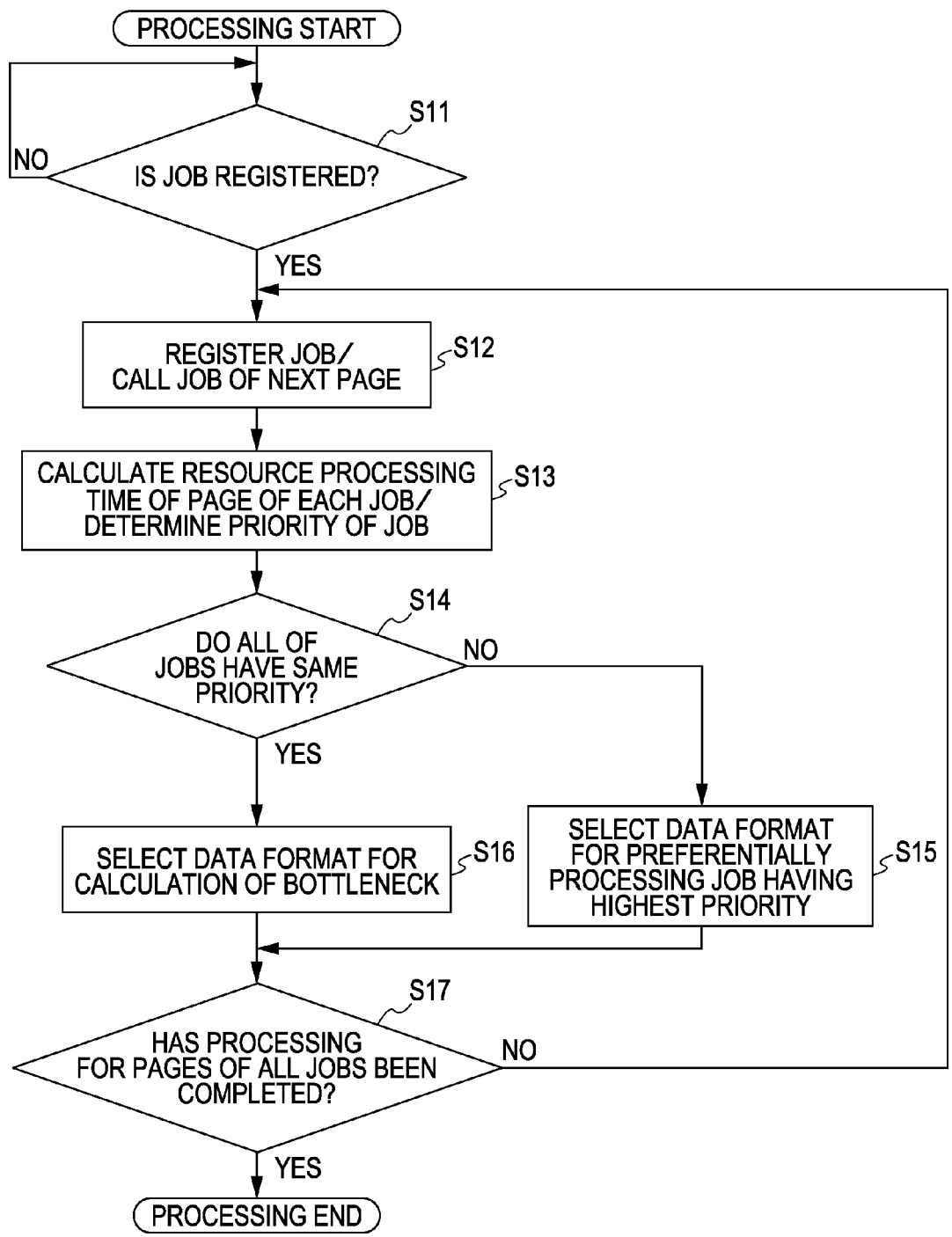
FIG. 10 is a flowchart showing an example of a second data processing procedure executed by a data processing apparatus according to an exemplary embodiment of the present invention.
Figure 12:
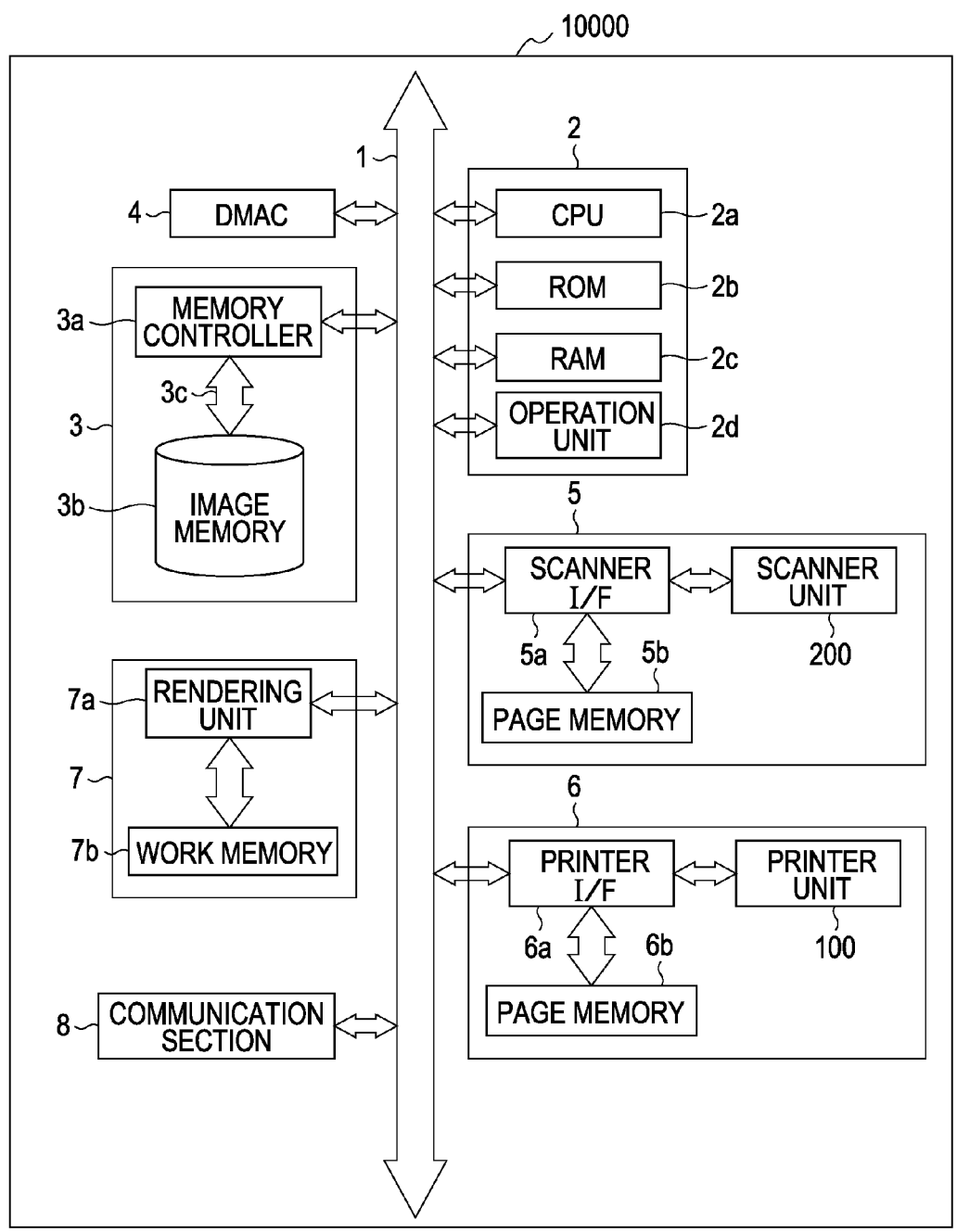
FIG. 12 is a block diagram showing an example of a configuration of a data processing system using an image memory according to the related art.

FIG. 10 is a flowchart showing an example of a second data processing procedure executed by the CPU 2a and the data selecting section 9 of the image processing apparatus 7000 according to this exemplary embodiment. This example shows a processing example for dynamically determining a data processing format of a job in accordance with a data processing format selected by the data selecting section 9 when the CPU 2a processes the job. The CPU 2a and the data selecting section 9 load a control program stored in the ROM 2b to the RAM 2c and execute the control program, thereby realizing each of steps S11 through S17.

At S11, the job managing unit 9a determines whether a job is registered in the image processing apparatus 7000 in response to a job execution request. If the job managing unit 9a determines that the job is registered, the process proceeds to S12, if a determination is made that the job is not registered, the job registration determination is repeated. At S12, the CPU 2a calls header information from a start page of data of the job and sequentially registers the job type 4002, the data format 4003, the data size 4004, and the page number 4005 in the job managing unit 9a.

The resource processing calculating unit 9b calculates time for processing each page registered at the page number 4005 of the table using each resource based on the information registered in the job managing unit 9a.

At S13, the job managing unit 9a determines the priority of each job to be processed by comparing priorities of the registered job type and the other registered job types with reference to the priority management table 9c. At S14, the job managing unit 9a compares the priority assigned to each job to determine whether all of the jobs have the same priority.

If the job managing unit 9a determines that all of the jobs do not have the same priority, the process proceeds to S15.

When the priority of each job differs from one another as a result of the comparison of the processing priorities of the jobs, overlapping of a resource that can be used by the job having the highest priority and a resource that can be used by the job having the lower priority has to be avoided.

Accordingly, at S15, the data selecting section 9 preferentially selects, regarding the job having the lower priority, the data format that can be processed by a resource not used by the job having the highest priority regardless of the calculated bottleneck. The process then proceeds to S17.

If it is determined that all of the jobs have the same priority at S14, the process proceeds to S16.

At S16, the data selecting section 9 compares processing time of each data using each resource as in the case of the first exemplary embodiment to determine the bottleneck and selects a data format that reduces the bottleneck processing time. The data selecting section 9 sends a data selection signal to the CPU 2a. The CPU 2a then sets a start address of the data format to be called in the DMAC 4 to start processing the appropriate data format.

At S17, the job managing unit 9a determines whether data selection for pages of all of the registered jobs has been completed after the selection of the data format of one page based on the data format of the job selected at S15 and S16.

If the job managing unit 9a determines that the data format of each page of all of the registered jobs has not been selected, the process returns to S12. Processing starting from calling of header information of the next page is repeated.

If the job managing unit 9a determines that the data format of each page of all of the registered jobs has been selected at S17, the image processing apparatus 7000 terminates the operation in response to completion of the data format selection and processing of the job.

In this exemplary embodiment, even when a job is newly registered, processing time for each page of each job is calculated in consideration for a plurality of pieces of job information. The priority of the processing is also dynamically determined. To preferentially process the job having the highest priority, the data selecting section 9 selects, regarding the job having the lower priority, an appropriate data format to avoid overlapping of resources mainly used by the job having the highest priority. In this manner, processing for taking full advantage of resources of the image processing apparatus 7000 can be executed regarding the job having the highest priority. Furthermore, by selecting a different data format for the job having the lower priority, the data processing can be continuously executed without stopping.

In the above-described exemplary embodiment, the data selecting section 9 controls printing processing and preview processing using data of a data format that is determined to reduce the bottleneck processing time. However, the data selecting section 9 may execute printing processing and preview processing using data of a data format that gives a smallest sum of processing times calculated by the resource processing calculating unit 9b.

One example of important configurations in the control operation described in the exemplary embodiment will be described below. For example, a data processing apparatus, such as an image processing apparatus, has a data processing section for allowing a plurality of data processing units to process data of jobs. The data processing section determines whether to process data of a first job in a first data format that requires longer processing time in processing by a second data processing unit than in processing by a first data processing unit. Alternatively, the data processing section determines whether to process the data of the first job in a second data format that requires longer processing time in processing by the first data processing unit than in processing by the second data processing unit. At this time, the data processing apparatus makes such determination based on whether processing of data of a second job that is executed in parallel to the first job requires longer time in processing by the first data processing unit or processing by the second data processing unit.

A third exemplary embodiment of the present invention will be described below referring to the drawings. A configuration of data processing programs that can be read by an image processing apparatus according to an exemplary embodiment of the present invention will be described below with reference to a memory map shown in FIG. 11.

FIG. 11 is a diagram illustrating a memory map of a storage medium for storing various data processing programs that can be read by an image processing apparatus according to an exemplary embodiment of the present invention.

Although not shown, the storage medium may store information for managing programs stored on the storage medium, such as, for example, version information and creator information. The storage medium may also store information depending on an operating system (OS) on a program reading side, such as, for example, icons to be displayed to identify the programs.

Data belonging to the various programs are managed in directories. In addition, the storage medium may store a program for installing the various programs in a computer and a program for decompressing a compressed program to be installed.

The functions shown in FIGS. 6 and 10 according to the exemplary embodiments may be realized by a host computer in accordance with programs installed from the outside. In such a case, the present invention can be applied to a case where information including the programs is supplied to an output device from a computer-readable storage medium, such as a CD-ROM, a flash memory, or an FD, or an external storage medium via a network.

As described above, a computer-readable storage medium storing program codes of software for realizing the functions of the above-described exemplary embodiments is supplied to a system or an apparatus. A computer (or a CPU or an MPU) included in the system or the apparatus reads out and executes the program codes stored on the storage medium. The functions of the exemplary embodiments can be achieved in such a manner.

In this case, the program codes read out from the storage medium realize novel functions of the present invention. The storage medium storing the program codes constitutes the present invention.

Accordingly, the program may be in any form, such as an object code, a program executed by an interpreter, or script data supplied to an OS, as long as the program has the functions of the program.

Types of a computer-readable storage medium for use in supplying the program include, for example, a flexible disk, a hard disk, an optical disc such as a CD-ROM, a CD-R, a CD-RW, or a DVD, a magneto-optical disk such as an MO, a magnetic tape, a nonvolatile memory card, and a ROM.

In this case, the program codes read out from the computer-readable storage medium realize the functions of the above-described exemplary embodiments and the storage medium storing the program codes constitutes the present invention.

In addition, the program supplying method includes a case where a user accesses an Internet web site using a browser of a client computer and downloads the computer program according to an exemplary embodiment of the present invention or a compressed file having an automatic installation function to a recording medium, such as a hard disk, from the web site. In addition, program codes constituting the program according to the exemplary embodiment of the present invention may be divided into a plurality of files and the plurality of files may be downloaded from different web sites. In this manner, the functions of the above-described exemplary embodiments can be realized. That is, the present invention also includes a WWW server or an ftp server that allows a plurality of users to download program files for realizing the functions of the exemplary embodiments of the present invention in a computer.

The program according to the exemplary embodiment of the present invention may be encrypted and recorded on a storage medium, such as a CD-ROM, and the storage medium may be distributed to users. In this case, users satisfying a predetermined condition may be permitted to download key information for decrypting the encryption from a web site via the Internet, execute the encrypted program using the key information, and install the program in a computer.

In addition to realization of the functions according to the above-described exemplary embodiments by the computer's execution of the read out program codes, an operating system (OS) running on the computer may execute part of or all of actual processing on the basis of instructions of the program codes, whereby the functions of the exemplary embodiments may be realized. The present invention also includes such a case.

Furthermore, the program codes read out from a storage medium may be written in a memory of a function expansion board inserted into the computer or a function expansion unit connected to the computer. A CPU or the like included in the function expansion board or the function expansion unit may execute part of or all of actual processing on the basis of instructions of the program codes, thereby realizing the functions of the above-described exemplary embodiments. The present invention also includes such a case.

It should be understood that the present invention is not limited to the above-described exemplary embodiments and can be variously modified based on the spirit of the present invention (including combinations of the exemplary embodiments). These modifications should not be excluded from the scope of the present invention.

Although the description has been given for various examples and exemplary embodiments of the present invention, the spirit and scope of the present invention should not be limited to the specific description given herein.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-187117 filed on Jul. 18, 2008, which is hereby incorporated by reference herein in its entirety.

What is claimed is:

1. A data processing apparatus for processing data of a job, the apparatus comprising:
    a storing unit configured to store data of a first job in both a first data format and a second data format,
    where time for a second data processing of the data in the first data format is longer than time for a first data processing of the data in the first data format, and
    where time for the first data processing of the data in the second data format is longer than time for the second data processing of the data in the second data format;
    a processor configured to select one of the first data format and the second data format as a data format used to process the data of the first job, based on whether each of the first and second data processing is performed on data of a second job and based on whether time for the first data processing of the data of the second job or time for the second data processing of the data of the second job is longer, the second job being executed in parallel to the first job, the second job and the first job utilizing at least one same resource in order to perform each of the first and second data processing; and
    the processor is configured to cause at least one of the first and second data processing to be performed on the data in the selected data format for the first job.

2. The apparatus according to claim 1, wherein the processor determines, in a case where time for the first data processing of the data of the second job is longer than time for the second data processing of the data of the second iob, to process the data in the first data format where time for the second data processing is longer than time for the first data processing.

3. The apparatus according to claim 1, wherein the first job is a job containing data of a plurality of pages, and
    wherein the processor unit makes the determination for each of the plurality of pages.

4. The apparatus according to claim 1, wherein the first data format indicates data that has not undergone rendering executed by a rendering unit, and
    wherein the second data format indicates data that has undergone rendering executed by the rendering unit.

5. The apparatus according to claim 1, wherein the first data processing is processing for reading out data from the storing unit or writing data in the storing unit, and
    wherein the second data processing is rendering processing for rendering unrendered image data.

6. The apparatus according to claim 1, wherein the processor selects one of the first data format and the second data format to avoid overlapping of data processing among the first and second data processing to be performed on the data of the first job and data processing among the first and second data processing to be performed on the data of the second job.

7. A control method for controlling a data processing apparatus for processing data of a job, the method comprising:
    storing data of a first job in a storing unit in a first data format and a second data format,
    where time for a second data processing of the data in the first data format is longer than time for a first data processing of the data in the first data format, and where a time for the first data processing of the data in the second data format is longer than time for the second data processing of the data in the second data format;

selecting one of the first data format and the second data format as a data format used to process the data of the first job, based on whether each of the first and second data processing is performed on data of a second job and based on whether time for the first data processing of the data of the second job or time for the second data processing of the data of the second job is longer, the second job being executed in parallel to the first job, the second job and the first job utilizing at least one same resource in order to perform each of the first and second data processing; and causing at least one of the first and second data processing to be performed on the data in the determined data format for the first job.

8. The method according to claim 7, wherein it is determined that, in a case where time for the first data processing of the data of the second job is longer than time for the second data processing of the data of the second job, the data is processed in the first data format where time for the second data processing is longer than time for the first data processing.

9. The method according to claim 7, wherein the first job is a job containing data of a plurality of pages, and
wherein the determination is made for each of the plurality of pages.

10. The method according to claim 7, wherein the first data format indicates data that has not undergone rendering executed by a rendering unit, and
wherein the second data format indicates data that has undergone rendering executed by the rendering unit.

11. The method according to claim 7, wherein the first data processing is processing for reading out data from the storing unit or writing data in the storing unit, and
wherein the second data processing is rendering processing for rendering unrendered image data.

12. A non-transitory computer-readable storage medium storing a computer-executable process, the computer-executable process causing a computer to perform a method of controlling a data processing apparatus for processing data of a job, the method comprising:

storing data of a first job in a storing unit in a first data format and a second data format, where time for a second data processing of the data in the first data format is longer than time for a first data processing of the data in the first data format, and where time for the first data processing of the data in the second data format is longer than time for the first data processing of the data in the second data format;

selecting one of the first data format and the second data format as a data format used to process the data of the first job, based on whether each of the first and second data processing is performed on data of a second job and based on whether time for the first data processing of the data of the second job or time for the second data processing of the data of the second job is longer, the second job being executed in parallel to the first job, the second job and the first job utilizing at least one same resource in order to perform each of the first and second data processing; and causing at least one of the first and second data processing to be performed on the data in the determined selected data format for the first job.

\* \* \* \* \*